ELECTRIC MOTOR CONTROL SYSTEM

Original Filed March 14, 1944 2 Sheets-Sheet 1

INVENTOR:
F. W. MEREDITH

BY: Moore & Hall
ATTORNEYS

June 2, 1953 F. W. MEREDITH Re. 23,664

ELECTRIC MOTOR CONTROL SYSTEM

Original Filed March 14, 1944 2 Sheets-Sheet 2

INVENTOR:
F. W. MEREDITH
BY:
Moore & Hall

Reissued June 2, 1953 Re. 23,664

UNITED STATES PATENT OFFICE 23,664

ELECTRIC MOTOR CONTROL SYSTEM

Frederick William Meredith, Cheltenham, England, assignor to S. Smith & Sons (England) Limited, a British company Original No. 2,512,665, dated June 27, 1950, Serial No. 526,434, March 14, 1944. Application for reissue June 26, 1951, Serial No. 233,510. In Great Britain October 18, 1943

27 Claims. (Cl. 318—18)

Matter enclosed in heavy brackets [ ] appears in the original patent but forms no part of this reissue specification; matter printed in italics indicates the additions made by reissue.

This invention consists of improvements in or relating to electric motor control systems in which a variable quantity controls an electric motor. The invention is particularly applicable to automatic control systems for maintaining a physical condition at a datum value in which the variable quantity is the variation of the physical condition from the datum value and the electric motor operates to restore the condition to the datum value. Thus a platform on an aircraft or on a ship may be stabilised about a horizontal axis by arranging that any movement of the platform from a datum position shall operate the motor to restore the platform to its initial position. [and broadly speaking the physical condition herein referred to may be the position of a body in relation to a datum position, the speed of linear or rotational movement of a body in relation to a datum speed, the temperature of a body in relation to a datum temperature, the pressure in a fluid body in relation to a datum pressure or any other physical condition which can be controlled directly or indirectly by the torque of an electric motor.]

[Although capable of the above application] The present invention was primarily developed to meet the requirements of an aircraft autopilot designed to meet the following specifications among others.

(a) Capable of rapid correctly coordinated maneuver.

(b) Able to maintain a compass course indefinitely.

(c) Capable of being coupled to radio devices to seek and follow a radio "track" and to follow a glide path beam for blind approach.

(d) Simple and fool-proof to operate.

(e) Safe in the event of any foreseeable failure of the pilot.

(f) Low maintenance requirement.

(g) Capable of rapid replacement by units in the event of failure so that the device will function without delay and dislocation of flight schedules.

These requirements are believed best met by an electrical signal system which is deemed essential to provide the necessary flexibility to satisfy present and continually developing needs of radio guidance and the stability peculiarities of new designs of aeroplanes. The use of A. C. for both signal and power systems not only helps avoid some of the contact troubles of electric systems, but is in line with the trend of electric supply in aircraft. The invention has been found to operate to advantage on 115 volt 3-phase 400 cycle supply. To meet the above requirements only commutatorless motors were deemed acceptable and it was decided to use induction type signal generators, except for a few power driven potentiometers which could employ relatively heavy brush pressures.

In the invention of a device of such complexity as an auto pilot one forms known elements in new combinations and combines them with new components to produce the final successful result. The characteristics of the new elements here permeate the combination and are vital to the present invention which would not exist without them.

Fortunately greatly improved relays in miniature form and hermetically sealed have recently become available, solving part of the above problem without risk of contact failures. The position on the motor side was not favorable as no small low inertia motors of the induction type of reasonable efficiency were available.

The theoretical possibilities of the hysteresis motor seemed attractive and it is perhaps fortunate that in turning from the development of fluid power system to electric systems applicant was lacking in the conventional training of an electrical engineer and so was unaware that the hysteresis motor was little more than a laboratory freak or of the Steinmetz proof that its efficiency was limited to a few percent.

Technical Paper 47–218 of the American Institute of Electrical Engineers, August 1947 states in the opening lines of the introduction, "The hysteresis motor, as a practical type of power motor, is virtually unknown." "The efficiency limits . . . range from a high of 0.5% to a low of 0.16%."

Accordingly, as part of the present invention applicant was compelled by necessity to develop a small motor of reasonably high efficiency which would have a straight line torque characteristic independent of speed or "armature" current, would accelerate from standstill to 12,000 or 24,000 R. P. M. in a few milliseconds and would deliver full load torque continuously when stalled without over heating. A practical motor of these characteristics was not available at the time applicant made his present invention. Such a motor was successfully invented by applicant and appears in Figs. 2 and 3 of the drawings and is described in detail in copending application S. N. 526,436 filed the same day as this application.

This new motor is an important element of the auto pilot and is an integral [and vital] part of the electric motor control system of the present invention as will appear below in the discussion of such systems.

In such systems it is desirable that the motor should have a high acceleration since any lag in the response of the motor to changes of control voltage may lead to hunting. *An* [On] object of the invention is to provide a control system having these characteristics.

According to this invention an electric motor control system in which a variable quantity controls an electric motor is characterised by the use of a hysteresis motor. By a "hysteresis motor" is meant one in which the rotor *has a high hysteretic constant,* is subjected to a rotating field, [and] is not provided with any winding (squirrel cage or otherwise) and preferably is not provided with any salient poles. Since the rotor carries no copper it can be made exceedingly light and at the same time a large torque can be obtained.

In such systems it is also sometimes desirable that the torque of the motor shall be determined by the control voltage applied to the motor and not by the other variables such as the speed of the motor, and a further object of the invention is to provide a control system having that characteristic.

According to one form of this invention an electric motor control system in which a variable quantity regulates the torque of an electric motor is characterized by the use of a hysteresis motor to ensure that the torque of the motor shall be determined by the control voltage applied to the motor and shall be substantially independent of the speed of the motor. Preferably the hysteresis torque is made as large as possible by suitably proportioning and selecting the ferro-magnetic material.

Up to synchronous speed the torque of a hysteresis motor is substantially independent of speed and is determined by the control voltage applied to the motor.

In the accompanying drawings.

In the drawings like numerals refer to like parts throughout.

Figure 1:
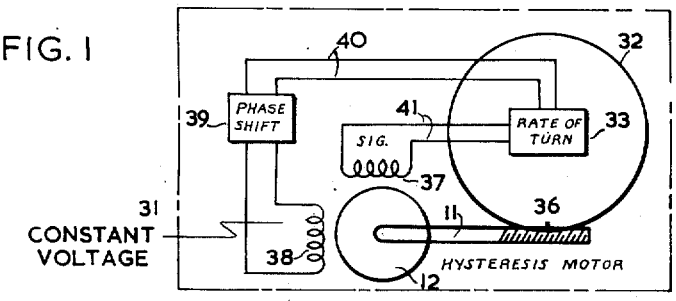
Figure 1 is a diagram in plan indicating an arrangement used for stabilizing in azimuth a turntable rotatably mounted on an aircraft, by the use of a hysteresis motor.

Referring to Fig. 1, a turntable 32 is rotatably mounted in azimuth on a fixed part *31* of an aircraft. A device 33 is mounted on turntable 32 for detecting and measuring rate of turn in azimuth. Device 33 is described and illustrated in copending application S. N. 504,072 which has matured into Patent No. 2,455,939. The device 33 emits two A. C. signals. As shown in Fig. 5B of the above patent "Automatic Volume Control 218" delivers one signal of constant amplitude *and* [which] the "Signal Indicator or Control Device" of Fig. 5B delivers the other signal which has an amplitude proportional to the detected rate of turn in azimuth.

The constant amplitude A. C. control voltage signal is fed through leads 40 and phase-changing device 39 to the phase winding 38 of a hysteresis motor shown in Figs. 2 and 3. The rate of turn signal modulated carrier of the same frequency is fed through leads 41 to the second phase winding 37 of the motor which is shown in quadrature with windings 38, representing the action of phase changing device 39 and the ninety degree shift in phase of the constant amplitude A. C. control signal in winding 38.

Rotor 12 comprising a sleeve of ferro magnetic material of high coercivity is operatively connected through suitable reduction gearing 36 with turntable 32 so as to rotate the turntable 32 in the opposite sense or direction to the rate of turn to which the device 33 is subjected. Rotor 12 then rotates turntable 32 at the same rate as, but in the opposite sense to, the rate of turn of the aircraft in azimuth. If the two rates of turn are not equal and opposite the device 33 is subjected to a rate of turn and rotor 12 of the hysteresis motor is actuated until the absolute rate of turn of the device 33 is zero and no signal is supplied to leads 41 and phase winding 37.

As the two rates are always equal, the angle through which the turntable 32 is rotated is equal to the angle through which the aircraft turns in azimuth and hence the turntable 32 is stabilized against azimuthal movements of the aircraft.

The torque exerted by rotor 12 of the hysteresis motor and therefore the acceleration of rotor 12 *is* proportional to the output through leads 41 and hence to the detected rate of turn. It follows that the stabilizing system itself is stable.

The examples relate only to the stabilization of a turntable in azimuth. It will be understood that the invention is equally applicable to the stabilization of another body *about one or more axes* such as a pivoted or gimballed platform.

Figure 2:
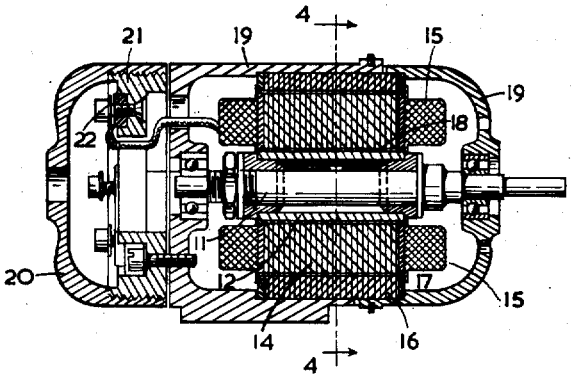
Figure 2 is a longitudinal sectional elevation of one form of hysteresis motor suitable for use in this invention.
Figure 3:
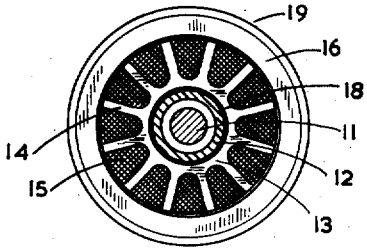
Figure 3 is a transverse section on the line 4—4 of Figure 3.

The hysteresis motor indicated in Fig. 1 at 12, 37 and 38 is illustrated in detail in Figs. 2 and 3. The rotor 12 consists of a sleeve of ferro-magnetic material of high coercivity (for example a coercivity of 250). This sleeve 12 is secured to the shaft 11 rotatably mounted in anti-friction bearings. The stator is a tubular body of ferro-magnetic material of high permeability and of comparatively low coercivity comprising an uninterrupted cylindrical wall 13 and a number (say twelve) of equally-spaced radial bars 14 having between them slots 15 which are open at their outer ends and receive the polyphase windings. These bars 14 and slots 15 are embraced by a sleeve 16. The stator 13, 14 and sleeve 16 are laminated to reduce eddy currents. The stator laminations may be held together by end-plates 17.

Between the cylindrical wall 13 of the stator and the rotor 12 is a narrow air-gap 18 of approximately 0.005". *Although the width of gap 18 is a factor of considerable importance in the efficiency and the response of the hysteresis motor and for optimum results in automatic pilot*

*systems the gap 18 should be kept small, a larger gap may be used where sacrifice in performance and efficiency is permissible. In general it has been found that a gap greater than two per cent of rotor diameter exceeds what may be regarded as the maximum tolerance for acceptable results with the present invention.*

The motor is provided with a casing 19 which houses the sleeve 16 and therefore carries the stator and also carries the bearings for the rotor shaft 11. An end cap for the casing 19 encloses a panel 21 for the terminals 22 of the stator windings. Figures 2 and 3 illustrate on a scale twice the actual size a hysteresis motor which has been successfully operated. The motor excitation is arranged to give maximum efficiency as described in United States patent application Serial No. 526,435 corresponding with British application No. 21,944/43.

It will be understood that in carrying this invention into effect, where the motor is to be controlled so that its acceleration is proportional to the variable quantity itself the control voltage may be made proportional to the variable quantity so that the motor torque is substantially proportional to the variable quantity over a limited range.

Figure 5:
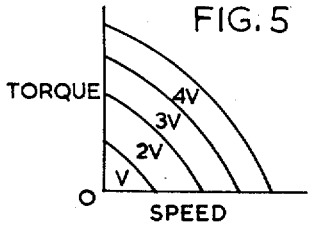
Fig. 5 is a family of curves representing the torque-speed characteristics of a typical well-known Ferraris motor.
Figure 4:
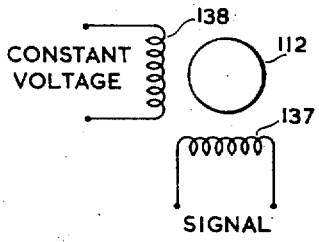
Fig. 4 is a schematic representation of a two phase motor of the induction type.

As indicated one of the basic problems of the present invention was the provision of a small practical motor of the induction type with the characteristics outlined above. The Ferraris motor was well-known in the art and if connected with two phases in quadrature as shown in Fig. 4 has the characteristics of an induction motor with extremely high rotor resistance. With the windings shown in Fig. 4 and a constant amplitude A. C. control voltage applied to winding 138 and a signal modulated voltage of the same carrier frequency applied to winding 137, the family of torque-speed characteristic curves shown in Fig. 5 is obtained. Each curve corresponds to the labeled multiple of a signal voltage $v$ applied to winding 137.

Figure 7:
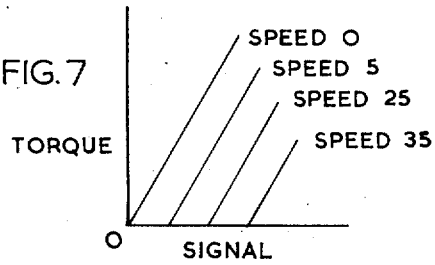
Fig. 7 is a family of curves derived from Fig. 5 representing the corresponding torque-signal characteristics of the Ferraris motor.

The curves of Fig. 5 readily convert to the torque-signal curves of Fig. 7, showing that with each signal level in winding 137 a different torque-speed relation obtains.

Figure 6:
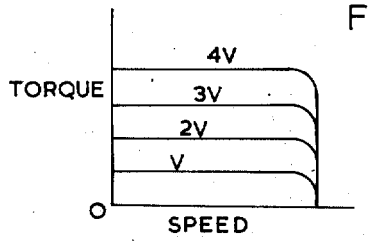
Fig. 6 is a family of curves representing the torque-speed characteristics of the hysteresis motor forming an integral part of the present invention.
Figure 8:
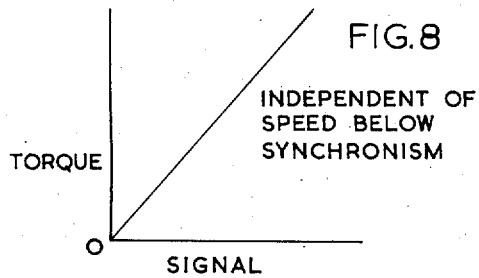
Fig. 8 is a graph derived from Fig. 6 representing the corresponding torque signal characteristics of the hysteresis motor forming part of the invention and showing it to be independent of rotor speed.

The hysteresis motor of Figs. 2 and 3 yields the torque-speed characteristic shown by the family of curves in Fig. 6. Fig. 8 shows the torque-signal characteristic derived from the curves of Fig. 6 and graphically demonstrates that below synchronism the torque-signal characteristic is linear and independent of rotor speed. This is attested by the top curve in each of graphs XVIII through XXIII of the Technical Paper 47–218 of the A. I. E. E.

If a stabilizing system of the type disclosed in the present application is to operate successfully the torque-signal characteristic of the motor concerned must correspond to that shown in Fig. 8 as demonstrated below.

Where:

$\theta$ is taken as the displacement of a platform previously referred to from a datum position.

$\theta_0$ is the original displacement.

$(\dot{\theta})_0$ is the initial velocity of displacement. As the platform returns to its original position in an exponential manner and is stabilized in its datum position, $(\dot{\theta})$ is the first derivative of $\theta$ with respect to time and $(\dot{\theta})_0$ is the initial velocity of the original displacement $\theta_0$.

$\ddot{\theta}$ in the same manner is the second derivative of $\theta$ with respect to time, that is the acceleration of the platform or the rate of its rate of displacement.

I is a constant determined by the inertia of the system.

T is the restoring torque, opposite in direction to displacement $\theta$ of the platform as well $\dot{\theta}$ and $\ddot{\theta}$, generated by the rotor 12 of the motor.

If it be assumed that an aircraft applies an acceleration force $\ddot{\theta}$ to a platform with an inertia constant I then the platform can be restored to datum by an equal and opposite force or its kinematic equivalent torque T acting in an opposite direction to $\ddot{\theta}$. We may then equate $$I\ddot{\theta}=-T$$

$$I\ddot{\theta}+T=0$$

Where, as in the present invention, a detector 33 is employed giving a signal proportional to the rate of turn or angular acceleration of the platform and this signal is supplied to a motor having the torque-speed, torque-signal characteristic of Fig. 8 the above equation of motion becomes $$\ddot{\theta}+a\dot{\theta}=0$$

$$\theta=\theta_0+\frac{1}{a}(\dot{\theta})_0-\frac{(\dot{\theta})_0}{a}e^{-at}$$

With a control system using a motor of the characteristics of Fig. 5, where T is a function of both $\theta$ and $\dot{\theta}$ as determined by combining the motor and signal pick-off characteristics, the solution of the differential equation $$I\ddot{\theta}+T=0$$

if possible at all, will in general involve long and intricate mathematical computation for each set of initial conditions in which a complete series of rate signals in winding 137 must be evaluated for each setting of control amplitude in winding 138 and interpolated curves plotted. It is believed that any results obtained would be of highly uncertain accuracy and unreliable.

The hysteresis motor of Figs. 2 and 3 is an integral part of the solution of the control problem of the present invention. It eliminated any necessity of the laborious and doubtful computations just referred to and provided a power motor over the entire speed range plus the required control behavior with certainty and reliability. Such an hysteresis motor has been constructed in a twelve and a half watt size and successfully operated as an element in the present invention as part of an auto pilot. With a thirty-five percent cobalt magnet steel rotor 12 it accelerates from rest to 24,000 R. P. M. in 1/10 second.

Truly spectacular accelerations are possible with such materials as "Alcomax III" which has about five times the hysteretic power of thirty-five percent cobalt steel. However, heat dissipation while continuously delivering full load torque at stand still is *a* limiting factor in rotor design in the auto-pilot of the present invention.

The above disclosure sets forth what are at present considered to be the preferred embodiments of the invention. The invention is set forth in generic terms in the appended claims *which are intended to cover all forms which fall* within the true spirit and scope of the invention.

I claim:

1. [In] An automatic pilot control system for maintaining a physical condition at a datum value in a movable craft comprising in combination a member the position of which in relation to a datum position represents the variation of the physical condition from the datum value, means whereby the movement of said member generates an A. C. control voltage, a motor the field of which is energised by said voltage and means by which the motor operates to restore the physical condition to the datum said motor being a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising an annular magnetic armature constructed at least in part of a magnetic material having a high hysteretic constant said members having complementary cylindrical adjacent surfaces forming an air gap therebetween and having such relative diameters that said air gap is substantially the minimum permitted by manufacturing tolerances, and means for mounting said members for relative rotation.

2. [In] An automatic pilot control system in a movable craft in which a variable quantity regulates the torque of an electric motor characterized by the use of a hysteresis motor to ensure that the torque of the motor shall be determined by the control voltage applied to the motor and shall be substantially independent of the speed of the motor, *a motor, means to supply said variable quantity to said motor,* said motor being a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising an annular magnetic armature constructed at least in part of a magnetic material having a high hysteretic constant said members having complementary cylindrical adjacent surfaces forming an air gap therebetween and having such relative diameters that said air gap is *less than 0.009 of an inch in width,* [substantially the minimum permitted by manufacturing tolerances, and] means for mounting said members for relative rotation, *and means operatively connecting said rotor to said system.*

3. [In] An automatic pilot control system for maintaining a physical condition at a datum value in a movable craft comprising in combination a movable member the position of which in relation to a datum position represents the variation of the physical condition from its datum value, means whereby the movement of said member generates an A. C. control voltage, a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary smooth continuous cylindrical adjacent surfaces forming an air gap therebetween and having such relative diameters that said air gap is substantially the minimum permitted by manufacturing tolerances, means for mounting said members for relative rotation, means for applying the A. C. voltage to said stator winding and means operated by the rotor to restore the physical condition to its datum value.

4. An automatic electric-motor control system as claimed in claim 3 in which the means whereby the movement of said member generates an A. C. control voltage is a rate-of-turn device which generates an A. C. control voltage proportional to the rate of deviation of said member from its datum position and in which the torque of the motor is proportional to said control voltage.

5. In an automatic pilot control system in a movable craft for stabilizing a first body against the effects of rotation of a second body on which the first body is pivotally mounted on an axis about which the first body is to be stabilized comprising a device for detecting and measuring rate of turn mounted on one of the bodies and arranged to generate an A. C. control voltage proportional to the rate of turn of said body, a motor coupling the two bodies said motor being a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary smooth continuous cylindrical adjacent surfaces forming an air gap therebetween and having such relative diameters that said air gap is substantially the minimum permitted by manufacturing tolerances, means for mounting said members for relative rotation, said rotor geared to rotate the first body in relation to the second body and means for applying the A. C. control voltage to the wound stator to cause the first body to turn in the opposite direction from the direction in which the rate of turn device turns.

6. An automatic pilot control system in a movable craft for stabilizing a first body against the effects of rotation of a second body on which the first body is pivotally mounted on an axis about which the first body is to be stabilized comprising a device for detecting and measuring rate of turn mounted on one of said bodies and arranged to generate an A. C. control voltage proportional to the rate of turn, means to generate a carrier wave of the same frequency, a hysteresis motor said motor being a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant said members having complementary smooth continuous cylindrical adjacent surfaces forming an air gap therebetween and having such relative diameters that said air gap is substantially the minimum permitted by manufacturing tolerances, means for mounting said members for relative rotation, reduction gearing, said motor and gearing coupling the two bodies, and means for applying the control voltage to one stator winding and for applying the carrier wave voltage to another stator winding in quadrature to cause the first body to turn in the opposite direction from the turn of the rate of turn device.

7. An automatic pilot control system for stabilizing a table against the effects of rotation of an aircraft on which the table is rotatably mounted on an axis about which the table is to be stabilized comprising a rate-of-turn device mounted on said table adapted to generate an A. C. voltage proportional to the rate of turn of said table *a motor connected to said rate-of-turn device,* said motor being a self-starting asynchronous hysteresis motor including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary smooth continuous cylindrical adjacent surfaces forming an air gap therebetween and having such relative diameters that said air gap is substantially the minimum permitted by manufacturing tolerances, means for mounting said members for relative rotation, the winding of said motor being energised by said voltage and gearing operatively connecting said motor to said table to restore said table to its datum position when the aircraft is rotated about said axis.

8. In an automatic pilot control system for a movable craft, a movable member, means to detect movement of said member and to provide a control voltage which is a function thereof, a motor, said motor being a self-starting hysteresis motor having cooperating stator and rotor members, one of said last two members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said last two members comprising a magnetic armature constructed at least in part of a magnetic material having a high hysteretic constant, said last two members having completmentary cylindrical adjacent surfaces forming an air gap therebetween and having such relative diameters that said air gap is less than 0.009 inch in width, means for mounting said stator and rotor members for relative rotation, one phase of said polyphase winding being connected to receive said control voltage and drive means connecting said rotor member and said movable member.

9. The combination set forth in claim 8, said movable member comprising a surface mounted for rotation said air gap being less than 0.007 inch in width.

10. The combination set forth in claim 9, said means to detect movement comprising a rate of turn device mounted on said surface and constructed to produce a voltage which is a function of the rate of turn of said surface said air gap being less than 0.005 inch in width.

11. The combination set forth in claim 10, said motor being asynchronous and said other of said last two members having an annular magnetic armature having no path of high permeance within said annulus which shunts magnetic flux therefrom.

12. The combination set forth in claim 11, a base member, said movable surface member having a gimballed mounting on said base member.

*13. In an automatic pilot control system in a movable craft in which a variable quantity representing a condition of said craft regulates the torque of an electric motor which is of the hysteresis type to ensure that the torque of the motor shall be determined by the control voltage applied to the motor and shall be substantially independent of the speed of the motor, in combination a movable craft, a motor, means to detect said variable quantity and apply it to said motor, said motor being a self starting asynchronous hysteresis motor having cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising an annular magnetic armature constructed at least in part of a magnetic material having a high hysteretic constant and having no path of low reluctance acting to shunt magnetic flux from said annular armature, said members having complementary cylindrical adjacent surfaces spaced apart a distance of the order of 0.0075 inch, means mounting said members for relative rotation, means carried by said craft for affecting a condition thereof according to variations in said variable quantity and means operatively connecting said rotor member to said means for affecting the condition of said craft.*

*14. The combination set forth in claim 13, said distance between said surfaces being at least 0.0025 inch said means to detect said variable quantity comprising a rate of turn device constructed to produce a voltage which is a function of rate of turn representing a rate of change of condition of the craft.*

*15. An automatic pilot control system for maintaining a physical condition at a datum value in a movable craft comprising in combination a member the position of which in relation to a datum position represents the variation of the physical condition from the datum value, means whereby the movement of said member generates an A. C. control voltage, a motor the field of which is energised by said voltage and means by which the motor operates to restore the physical condition to the datum said motor being a self-starting asynchronous hysteresis motor including, co-operating stator and rotor members, one of said members comprising a magnetic core structure having a low conductivity to eddy currents and having a series of radially extending, angularly spaced winding slots and magnetic bridges for the ends thereof adjacent the other*

*member and a polyphase distributed energising winding disposed in said slots, the other of said members comprising an annular magnetic armature constructed at least in part of a magnetic material having a high hysteretic constant said members having complementary cylindrical adjacent surfaces forming an air gap therebetween and having such relative diameters that said air gap is less than .009 inch in width, and means for mounting said members for relative rotation.*

*16. The combination set forth in claim 15 wherein the said air gap is less than .007 inch in width.*

*17. The combination set forth in claim 15 wherein the said air gap is less than .005 inch in width.*

*18. An automatic pilot control system in a movable craft in which a variable quantity regulates the torque of an electric motor characterized by the use of a hyteresis motor to ensure that the torque of the motor shall be determined by the control voltage applied to the motor and shall be substantially independent of the speed of the motor, a motor, means to apply said variable quantity to said motor, said motor being a self-starting asynchronous hysteresis motor including, co-operating stator and rotor members, one of said members comprising a magnetic core structure having a low conductivity to eddy currents and having a series of radially extending angularly spaced winding slots and magnetic bridges for the ends thereof adjacent the other member and a polyphase distributed energizing winding disposed in said slots, the other of said members comprising an annular magnetic armature constructed at least in part of a magnetic material having a high hysteretic constant said members having complementary cylindrical adjacent surfaces forming an air gap therebetween and having such relative diameters that said air gap is less than .009 inch in width, and means for mounting said members for relative rotation, means carried by said craft for affecting the condition thereof according to variations in said variable quantity and means operatively connecting said rotor to said means for affecting the condition of said craft.*

*19. The combination set forth in claim 18 wherein the said air gap is less than .007 inch in width.*

*20. The combination set forth in claim 15 wherein the said air gap is less than .005 inch in width.*

*21. The combination set forth in claim 8, said*

*air gap being greater than 0.0015 of an inch in width.*

*22. The combination set forth in claim 1, said air gap being within the range of 0.009 of an inch maximum and 0.0015 of an inch minimum in width.*

*23. The combination set forth in claim 3, said air gap being within the range of 0.009 of an inch maximum and 0.0015 of an inch minimum.*

*24. The combination set forth in claim 3, said movable member comprising means sensitive to at least one acceleration force acting on said movable craft, said air gap being within the range of 0.009 of an inch maximum and 0.002 of an inch minimum.*

*25. The combination set forth in claim 7, said air gap being within the range of 0.009 of an inch maximum and 0.002 of an inch minimum.*

*26. The combination set forth in claim 3 said control system having at least two of said movable members each comprising means respectively sensitive to acceleration forces acting respectively about a major axis of the movable craft and each acting on individual means to produce a respective A. C. control voltage, at least two said motors each connected to receive its respective A. C. control voltage and each constructed to operate respective means to restore the physical condition about its respective said major axis to its datum value, said air gap in each said motor being within the range of 0.009 of an inch maximum and 0.002 of an inch minimum.*

*27. The combination set forth in claim 8, said movable member comprising a surface mounted for rotation about a plurality of axes, said means to detect movement of said member comprising a plurality of rate of turn devices each arranged to detect acceleration forces about one of said axes and each said means acting on respective means to produce a respective A. C. control voltage, a plurality of said motors and drive means connected for control by a respective control voltage.*

FREDERICK WILLIAM MEREDITH.

References Cited in the file of this patent or the original patent

UNITED STATES PATENTS

| Number | Name | Date |
|---|---|---|
| 2,014,825 | Watson | Sept. 17, 1935 |
| 2,115,086 | Riggs | Apr. 26, 1938 |
| 2,287,876 | Haight | Jun. 30, 1942 |
| 2,303,291 | Moss | Nov. 24, 1942 |
| 2,305,878 | Krussman et al. | Dec. 22, 1942 |